United States Patent [19]

Bachelard et al.

[11] Patent Number: 4,784,839

[45] Date of Patent: Nov. 15, 1988

[54] METHOD OF MAKING METAL CARBIDE AND NITRIDE POWDERS

[75] Inventors: Roland Bachelard; Philippe Joubert, both of Lyon, France

[73] Assignee: ATOCHEM, Courbevoie, France

[21] Appl. No.: 30,405

[22] Filed: Mar. 25, 1987

[30] Foreign Application Priority Data

Apr. 3, 1986 [FR] France .................................. 86 04764
Apr. 3, 1986 [FR] France .................................. 86 04765

[51] Int. Cl.$^4$ ........................................... C01B 31/36
[52] U.S. Cl. .................................... 423/290; 423/291; 423/344; 423/345; 423/439; 423/440; 423/409; 423/411; 423/412
[58] Field of Search ............... 423/290, 291, 344, 345, 423/439, 440, 409, 411, 412

[56] References Cited

U.S. PATENT DOCUMENTS

| | | | |
|---|---|---|---|
| 3,121,617 | 2/1964 | Amstein | 423/440 |
| 3,232,706 | 2/1966 | Kuhn | 423/346 |
| 3,253,886 | 5/1966 | Lamprey et al. | 501/96 |
| 3,469,941 | 9/1969 | Kuhn | 423/490 |
| 3,591,338 | 7/1971 | Roberts et al. | 423/411 |
| 3,692,479 | 9/1972 | Meadows et al. | 423/345 |
| 4,014,979 | 3/1977 | Dremin et al. | 423/290 |
| 4,017,587 | 4/1977 | Ditter et al. | 423/291 |
| 4,276,275 | 6/1981 | Ando et al. | 423/440 |
| 4,515,763 | 5/1985 | Boudart et al. | 423/409 |
| 4,529,575 | 7/1985 | Enomoto et al. | 423/345 |
| 4,571,331 | 2/1986 | Endou et al. | 423/345 |
| 4,626,422 | 12/1986 | Ritsko et al. | 423/344 |

FOREIGN PATENT DOCUMENTS

| | | | |
|---|---|---|---|
| 277467 | 1/1964 | Australia | 423/439 |
| 0082343 | 6/1983 | European Pat. Off. | 423/344 |
| 79699 | 12/1976 | Japan | 423/345 |
| 13500 | 2/1977 | Japan | 423/345 |
| 46398 | 4/1977 | Japan | 423/345 |
| 39399 | 3/1979 | Japan | 423/345 |
| 22611 | 3/1981 | Japan | 423/344 |
| 55322 | 4/1983 | Japan | 423/345 |
| 194731 | 11/1983 | Japan | 423/345 |
| 1030345 | 7/1983 | U.S.S.R. | 423/411 |
| 870083 | 6/1961 | United Kingdom | 423/291 |
| 870084 | 6/1961 | United Kingdom | 423/290 |
| 893164 | 4/1962 | United Kingdom | 423/412 |
| 901176 | 7/1962 | United Kingdom | 423/345 |
| 990651 | 4/1965 | United Kingdom | 423/290 |
| 1028977 | 5/1966 | United Kingdom | |

OTHER PUBLICATIONS

Wotting et al., "Powder Characteristics and Sintering Behavior of $Si_3N_4$ Powders", 18 *Powder Metallurgy Int'l.*, (1986) p. 25.

Vogt et al., "Synthesis of Ultrafine Ceramic and Metallic Powders in a Thermal Argon RF Plasma", ISPC-7, Eindhoven, Jul. 1985, Paper No. B-4-3, p. 668.

D. E. Fornwalt et al., "Characterization of Ultra-High Surface Area Tungsten Carbide," Micron, 1975, R, Cont., vol. 6: 147-152, Pergamon.

Saburo Iwama et al., "Ultrafine Powders of TiN and AlN Produced by a Reactive Gas Evaporation Technique with Electron Beam Heating," Journal of Crystal Growth 56(1982) 265-269, North-Holland Publishing Company.

Michael Hoch et al., "Preparation and Characterization of Ultrafine Powders of Refractory Nitrides: 1, AlN and $Si_3N_4$," Am. Ceram. Soc. Bull. (U.S.A.), vol. 58, No. 2 (1979).

*Primary Examiner*—John Doll
*Assistant Examiner*—Wayne A. Langel
*Attorney, Agent, or Firm*—Pennie & Edmonds

[57] ABSTRACT

Metal carbide and metal nitride powders produced by the carbothermal reduction of one or more metal oxides reacted with a binder material and a carbonaceous additive or optionally, a binder capable of supplying carbon to the reaction. The metal oxides are selected from among $SiO_2$, $Al_2O_3$, $TiO_2$, $ZrO_2$, $HfO_2$ and $B_2O_3$ and are combined with the binder in the presence of carbon to form granules having a controlled pore volume. The granules are then subjected to a carbothermal reduction reaction, in the presence of a nitrogen or a neutral atmosphere, to produce metal nitrides or metal carbides respectively, having an excess of carbon incorporated therein. The product is subsequently heated to react the excess carbon within the compound with oxygen from the atmosphere to form carbon monoxide gas, which may be removed by an optional exhaust system. The remaining metal carbide or metal nitride powder may then be collected and used in various applications such as the production of ceramic objects.

22 Claims, No Drawings

METHOD OF MAKING METAL CARBIDE AND NITRIDE POWDERS

FIELD OF THE INVENTION

The invention relates to the formation of metal carbide and metal nitride powders by the carbothermal reduction of metal oxides. These powders have many uses but they are particularly useful in the production of ceramic materials.

BACKGROUND OF THE INVENTION

Various processes for producing metal carbide and nitride compositions are known in the prior art. The scientific literature in this area describes three main access routes for the formation of these materials, particularly for the production of silicon nitride powders. These methods include gas phase reactions with halosilane and methane or ammonia, direct carbonization or nitridation from silicon and carbon or nitrogen and carbothermal reduction in the presence of a neutral or nitrogen atmosphere from silica and carbon (see, e.g., F. K. Van Dijen, et al., 117 *Spechsaal* (1984), pps. 627–9). In addition, metal carbide or nitride powders may also be produced on a laboratory scale by reactions requiring initiation by lasers or plasmas.

Unlike the laser or plasma techniques mentioned above, which result in the formation of carbides or nitrides having a large specific surface area, i.e., $\geq 100\text{-}150$ m$^2$/g (see, e.g., Y. Kizaki, et al. 24 *Japanese Journal of Applied Physics* (July, 1985) pps. 800–5 or Y. Suyama, et al. 64 *Am. Ceram. Soc. Bul.* (1985) p. 1356-9), the carbothermal reduction method normally leads to the formation of carbide or nitride powders having a surface area of $<20$ m$^2$/g. For example, the article by Van Dijen, discussed above, recites a value of 10–15 m$^2$/g as the maximum value which may be obtained in an optimized reaction; D. L. Segal, *Chemistry & Industry* (August 19, 1985) pps. 544–5 proposes a value of 5 m$^2$/g and S. C. Zhang, et al., 67 *J. Am. Cer. Soc.*, pps. 691–5 discloses 10.3 m$^2$/g.

SUMMARY OF THE INVENTION

The present invention proposes a new family of carbide and nitride powders produced by carbothermal reduction, and optionally, nitridation, which exhibit a useful specific surface area.

One object of the invention, therefore, is the formation of metal carbide and nitride powders which exhibit a specific surface area of at least about 30 m$^2$/g.

Another object of the invention is the formation of carbide and nitride powders having a specific surface area of between about 30 and 250 m$^2$/g. In the case of silicon nitride powders, the specific surface area ranges between about 40 and 250 m$^2$/g.

A further object of the invention is the formation of metal carbide and nitride powders in which at least 30% by weight thereof exhibits a crystalline structure. Specifically, in the case of silicon nitride powders it is a further object that at least 50% of such powder by weight exhibit a crystalline structure.

Another object of the invention is the formation of silicon nitride powders comprising from about 2 to about 40% of a beta phase.

A still further object of the present invention is the production of metal carbide and nitride powders in the form of agglomerates having average dimensions less then 5 micrometers and consisting of particles whose average dimensions are between 10 and 50 nm.

The invention also relates to a process for producing metal carbide and metal nitride powders A first embodiment of the invention relates to metal carbide and metal nitride powders having a specific surface area of at least about 30 m$^2$/g, and preferably between about 30–250 m$^2$/g. It is preferred that at least about 30% by weight of the powder exhibit a crystalline structure. In an alternate embodiment, a silicon nitride powder produced according to the invention, wherein at least 50% by weight of the powder exhibits a crystalline structure, exhibits a specific surface area of between about 40–250 m$^2$/g. This composition comprises between about 2–40% of a beta phase. The metal utilized in the formation of both the nitride and the carbide powders is selected from among silicon, aluminum, titanium, zirconium, hafnium and boron.

The product of the invention is produced in the form of agglomerates having an average dimension of less than 5 micrometers, preferably ranging between 10–50 nm by a process which comprises: reacting one or more metal oxide compositions selected from among $SiO_2$, $Al_2O_3$, $TiO_2$, $ZrO_2$, $HfO_2$ and $B_2O_3$ with a binder and a material capable of supplying carbon to the reaction or, optionally with a binder capable of supplying carbon to the reaction, such as a binder which has been coked at between about 350°–500° prior to reacting it with the metal oxide or mixture thereof. As a result of this reaction, granules having a pore volume of between about 0.1–3 cm$^3$/gram are formed. Optionally, the mixture may be kneaded and extruded prior to the formation of the granules so as to facilitate the formation of pores having a regular size.

The granules thus formed are then subjected to a carbothermal reduction reaction, at a temperature between about 1300°–1600° C., in, for example a nitrogenous atmosphere when the formation of metal nitrides is intended. In an alternate embodiment directed to the formation of silicon nitride powder compositions, the reaction temperature ranges between about 1300°–1500° C. To form the metal carbides, the reaction is performed either in a neutral atmosphere, or one comprising hydrogen or a noble gas such as argon. As a result of either of these carbothermal reactions, powder agglomerates are formed which incorporate an excess of carbon.

These aggomerates may be ground or screened so as to reduce the dimensions of the powder particles in order that the largest dimension of each powder granule ranges between about 1–30 mm. This powder is then heated to a temperature between about 500°–800° C. until substantially all of the excess carbon is reacted with the oxygen in the air to form a carbon monoxide gas. Because of the formation of this toxic gas, it is useful to connect emission control means to the chamber in which the reaction is carried out to direct the gas away from the working environment. After all of the excess carbon has been reacted, the resultant metal nitride or metal carbide powder may be collected, preferably for use in the formation of sintered ceramic materals.

DETAILED DESCRIPTION OF THE PREFERRED EMBODIMENTS

The present invention preferably concerns metal-based carbide and nitride powders wherein the metal moiety is selected from among the group consisting of silicon, aluminum, titanium, zirconium, hafnium, and boron.

In the process as taught by the applicants, the surface area of the powdered material is preferably measured by the application of the method described by Brunauer, et al, 60 *Journal of the American Chemical Society* (1938) p. 309. Additionally, the process utilized to evaluate the crystalline structure of the powder was an X-ray diffraction technique performed according to the method described by C. P. Gazzara, et al., 56 *Bull. Am. Ceram. Soc.* (1977) 777-80.

The process by which the powdered products of the present invention are formed comprises a series of steps, namely:

(a) Producing granules having a controlled pore volume by combining a metal oxide or a mixture thereof with a binder compound and a carbonaceous additive, or optionally, with a binder material capable of supplying carbon;

(b) carrying out a carbothermal reduction reaction involving the granules described above to form a product having an excess of carbon, which may optionally take place in a nitrogen containing atmosphere, a neutral atmosphere or one comprising hydrogen or a noble gas;

(c) removing the excess carbon supplied either independently or by the binder material as described in step a; and (d) collecting the resultant powdered product.

Step a, as noted above, is concerned with the formation of granules having a controlled pore volume. This operation requires the reaction of one or more metal oxides and one or more materials capable of supplying carbon and acting as a binder. A preferred alternate procedure concerns the reaction of one or more metal oxides with a binder material capable of supplying carbon to the reaction. The metal oxide is preferably selected from the group consisting of $SiO_2$, $Al_2O_3$, $TiO_2$, $ZrO_2$, $HfO_2$ and $B_2O_3$. The particle size of the metal oxides preferred for use in the present invention, should be less then 10 micrometers and most preferably on the order of 0.1-5 micrometers.

When the carbon is supplied by a material other than the binder, this material may preferably be selected from among materials such as plant carbon, thermal black, acetylene black, coke, carbon black and graphite. The grain size of this carbonaceous material is preferably less than 10 micrometers and most preferably on the order of from about 0.1 to 5 micrometers.

The binder material, either when used alone or in association with a carbonaceous material, may be selected from a large family of natural or synthetic substances capable of supplying carbon to the mixture during the course of a carbothermal reduction reaction. This material should also be capable of promoting the agglomeration of the oxides as well as the carbon, to facilitate the formation of granules. The preferred materials for this purpose include coal tars and resins or polymers, especially thermosetting resins such as phenolic resins, which include phenol formaldehyde, epoxy resins, polyimides, polyureas and polycarbonates.

Generally, the binder, when used alone or in conjunction with a compound capable of introducing carbon into the reaction, is added in an amount such that the carbon/metal oxide molar ratio is greater than 1 and preferably between 2-60:1. When both carbon and a binder are used, the amount of the binder should represent at least 2% of the weight of the metal oxide and carbon mixture.

The oxide or oxides, together with the binder and optionally the carbon-containing material, may initially be subjected to a kneading operation. This operation may be performed within a wide temperature range which may vary between ambient temperature and 200° C., the temperature chosen being governed by the binder used.

Subsequent to this kneading operation, the paste thus formed is advantageously shaped, preferably by an extrusion method. The extruded material thus obtained, for example, after cutting or grinding the rod formed by the extruder, is advantageously brought to a temperature between about 50° and 250° C., which makes possible the drying and/or setting of the binder, as well as its polymerization. This permits the agglomeration of these extruded particles in the form of granules.

In the process according to the invention it is possible, by varying the amount of binder used and/or by varying the temperature or pressure conditions (e.g., between about 2 and 200 bars) during the formation of the granules to more precisely regulate the pore volume of the granules which are to be subsequently subjected to the carbothermal reduction reaction.

In an alternate embodiment of the process of the invention, the binder may be coked at between about 350°-500° C. prior to commencing the carbothermal reduction reaction in order to incorporate the necessary carbon.

The granules thus produced as a result of this reaction between the metal oxide and the binder with preferably, an excess of carbon, have a controlled pore volume. More precisely, these granules preferably exhibit a pore volume which may be varied between about 0.1 and 3 $cm^3/g$. These pore volume measurements are preferably made using a mercury porosimeter in the zone between 0-2000 bars.

The granules may be produced in the form of particles having a regular or irregular shape, preferably as pellets or cylinders. In a preferred embodiment of the invention the greatest dimension of these particles is greater than about 0.5 mm and preferably between about 1-30 mm, but these values are given for purposes of demonstration only and should not be construed as limiting the invention in any manner.

In step b of applicants' process for forming a powdered product, the granules produced by the reaction of the oxide or oxides, the binder and, if necessary the additional carbon, mixed and agglomerated in granular form according to step a above, are subjected to a carbothermal reduction reaction. Reactions of this type may be performed at temperatures ranging between about 1300° and 1600°1 C. (1300° to 1500° C. in the case of silicon nitride). This reaction preferably is carried out in an atmosphere containing nitrogen or capable of releasing nitrogen under reaction conditions, when the reaction is intended to produce nitrides, alternately the reaction may be carried out in a neutral atmosphere to facilitate the formation of metal carbides. In the case of carbide production it is also possible to carry out the reaction in an atmosphere of hydrogen or a noble gas, such as, for example, argon.

Where a nitrogen atmosphere is used in the reaction, advantageously an excess thereof is supplied. The amount of nitrogen used can range from about 2 to about 10 times the stoichiometric requirement of the reaction, which constitutes an entire order of magnitude. Since the carbothermal reduction reaction releases oxygen (predominantly in the form of CO), if the reaction is permitted to continue until transformation of all of the metal oxide is completed, the process should include some form of CO emission control.

Step c is a decarbonizing operation, to eliminate the excess carbon supplied either directly by the binder or in the form of a carbonaceous additive. This reaction may advantageously be performed at a temperature between about 500° and 800° C. It will preferably be continued until all of the carbon is consumed. As discussed above, the apparatus for carrying out this reaction should include means for controlling the emission of the combustion gas, i.e., CO and $CO_2$.

At the end of the decarbonization process, the carbides or nitrides produced according to the invention are collected (step d) in the form of particles or agglomerates of particles exhibiting a preferred surface area. If necessary, it is possible to interpose a deagglomeration step which makes the average dimensions of the agglomerates more uniform, for example, by grinding or screening these agglomerates.

The carbide and nitride powders produced according to the invention exhibit a reproducible surface area (i.e., between about 30–250 $m^2/g$) which is disproportionate to the much smaller surface areas of the powders produced by the carbothermal reduction techniques described in the prior art (i.e., less than 20 $m^2/g$). These novel powders constitute materials of choice for producing ceramics since their properties permit easy sintering and facilitate the manufacture of sintered pieces of high density.

EXAMPLES The following examples are provided in order to illustrate the process of the invention. These examples are provided for purposes of illustration only and are not to be construed as limiting the scope of the invention in any manner.

EXAMPLE 1

115 g of a silica powder with the following characteristics was mixed in a kneader:
 specific area: 180 $m^2/g$
 median diameter: 2 micrometers
 loss to fire: 11.46%
 Si content: 40.53%
with 300 g of ex-acetylene carbon black whose characteristics were:
 specific area: 64 $m^2/g$
 median diameter: <3 micrometers
 purity: >99%

The kneader was provided with a heating jacket in which a heat-exchanging medium, brought to 80° C., was circulated. To obtain an extrudable mass, 660 g of pine tar was gradually added to the mixture of powders which were kept in constant motion. When the resultant paste exhibited a homogeneous appearance and a stable rheology, it was extruded in the form of rods, 5 mm in diameter, in an apparatus that made it possible to apply a pressure of about 80 bars.

These extrudates were first gradually air-dried at between ambient temperature and 200° C. Then, when they had acquired a solid consistency, they were coked by a heat treatment at 400° C. in a flow of nitrogen gas. At the end of these drying-coking operations, the loss in weight was 46.6%.

398 g of these hard extrudates were then subjected to a carbothermal reduction reaction in a nitrogen atmosphere. For this purpose, extrudates having a pore volume of 0.73 $cm^3/g$, were placed in a cylindrical reactor provided with a stream of nitrogen gas having a flow of 0.3 $m^3/h$. The temperature of the charge was then raised to 1400° C. in 1 h 30 min. This temperature was maintained for 5 hours, after which the heat treatment was ended and the product was allowed to cool under nitrogen scavenging. It was determined that the product was produced in the form of black granules having good mechanical strength. A total of 314 g of this product was collected.

This material was brought to a progressively higher temperature at 700° C. under an air current and kept at this temperature for 15 hours. After cooling, 48 g of a beige powder was collected and an analysis of the powder by X-ray diffraction revealed that it contained neither a detectable amount of crystallized silica (in the form of quartz or cristoballite) nor any residual carbon.

On the other hand, the presence of two crystallized varieties of silicon nitride and an amorphous phase were detected. An estimate of the respective contents of these various constituents was made according to the method described by C. P Gazzara, 56, *Bull. Am. Ceram. Soc.* (1977) pps. 77–80 which indicated the presence of:
 amorphous $Si_3N_4$: approximately 20%
 alpha $Si_3N_4$: approximately 45%
 beta $Si_3N_4$: approximately 35%

The specific surface area of these powder particles, determined according to the method described above by Brunauer, et al., was 88.8 $m^2/g$.

EXAMPLE 2

In a two-arm kneader, similar to that used in example 1, having an extrusion screw at the bottom of the kneading trough, 150 g of silica was mixed with 400 g of ex-acetylene carbon black to form the product of example 1. An aqueous solution of phenolic resin (Fen-O-Fen ®) was then gradually added: 126 g of pure resin and 24 g of polymerization catalyst were thus incorporated in the mixture to give it the correct consistency. The resultant paste was obtained in the form of extrudates 6 mm in diameter. These extrudates were then dried at 150° C. in a vacuum oven. During this treatment, the resin polymerized and the extrudates set. Their pore volume, determined by mercury porosimetry, was 1.46 $cm^3/g$.

They were then reimpregnated with an additional amount of Fen-O-Fen ® resin in the form of a methanol solution at 20% by weight of the polymer. In this way, 30.9% by weight of the granules, measured after drying in the oven, were incorporated therein. The pore volume of granules dried at 120° C. was thus brought to 0.97 $cm^3/g$. A 10 gram aliquot of these extrudates was then placed in a vertical reactor through which a nitrogen current was passed, having a flow of about 20 liters per hour.

The granules were then brought to 1400° C. in 2 hours and 10 min, then kept at this temperature for 5 hours. After cooling, 7.97 g of product, still in the form of granules, was collected. The excess of carbon was then eliminated by the combustion process set forth in example 1. The final residue weighed 1.22 g.

An analysis performed by X-ray diffraction showed that all of the silica had been reacted, that the carbon had been entirely eliminated, and that no oxynitride $Si_2N_2O$ was formed.

By applying the method described above, the respective constituents of the mixture were determined to include:
- 55% of alpha Si₃N₄
- 15% of beta Si₃N₄
- 30% of amorphous Si₃N₄.

The silicon nitride thus prepared exhibited a specific surface of 59 m²/g.

EXAMPLE 3

The reaction was carried out as set forth in example 2. However, the phenolic resin content introduced for this trial by successive impregnations with the methanol solution was 104% of the weight of the initial granules. The pore volume of the granules was 0.48 cm³/g. An aliquot of 10 g of these granules was subjected to a carbothermal reduction reaction under the same conditions as in example 2. The product of this reaction weighed 6.46 g. It additionally contained a considerable excess of carbon which was eliminated by combustion according to the procedure discussed in Example 1. The final residue weighed 0.74 g.

An analysis of the phases established that the silica was completely reacted and that the carbon had been completely eliminated. The only detectable crystallized phases were the alpha and beta varieties of Si₃N₄ which were accompanied by a preponderance of amorphous material. The mixture was actually determined to comprise about 40% of alpha Si₃N₄ and 10% of beta Si₃N₄. The specific area of the silicon nitride was 92 m²/g.

EXAMPLE 4

The metal oxide utilized in this experimental trial was gamma alumina exhibiting the following characteristics:
- specific area: approximately 100 m²/g.
- median diameter: <4 micrometers
- loss to fire: 6.9%
- purity: >99.5%

85 g of this product was mixed with 300 g of the ex-acetylene carbon black of example 1. Homogenization of the mixture was performed in a heating kneader. When the mixture appeared homogenous, 660 g of pine tar was gradually incorporated to change the charge into an extrudable paste. The extrusion took place at 80° C. and the product was in the form of threads measuring 5 mm in diameter.

These threads were then dried at 150° C. for 2 hours. The weight loss during this operation came to 22%. The consolidated extrudates were then coked with nitrogen scavenging. For this purpose the extrudates were heated to 450 ™ C. and kept at this temperature for 25 minutes, which caused an additional loss of 27% of the dried mass. The pore volume was 0.23 m²/g.

580 g of these dried and coked extrudates were then subjected to the carbonitridation step under the conditions described in example 1. The operation took place at 1400° C. and the extrudates were kept at this temperature for 4 hours, the oven being provided with a nitrogen flow of 0.3 m²/g.

After cooling, 480.2 g of black granules, containing excess carbon, were collected. These granules were ground in an impeller breaker and the collected powder was placed in a rotary cylindrical reactor.

After nitrogen purging of the enclosure was completed, the powder was heated to 500° C. and air was admitted into the oven while the oxygen content of the effluent gases was controlled. The air flow was modulated so that the oxygen level at the output did not exceed 2% by volume. Toward the end of the operation, the temperature was raised to 650° C. to facilitate the combustion of residual carbon. As a result, 67.2 g of grayish beige powder was collected.

An analysis of the resultant phases, performed by X-ray diffraction, revealed the total absence of alumina and carbon. The only crystallized phase detected was AlN (52%) accompanied by an amorphous phase.

The specific surface of this aluminum nitride was 34 m²/g.

EXAMPLE 5

85 g of gamma alumina, identical with that described in example 4, were mixed in a kneader with 300 g of the ex-acetylene carbon black described in example 1 and 1.5 liters of an aqueous solution containing 125 g of Fen-O-Fen ® phenolic resin as well as 25 g of a polymerization catalyst. This charge was extruded in the form of threads 6 mm in diameter which were then dried at 130° C. in a vacuum oven.

After this consolidation, the extrudates were impregnated with a methanol solution of a resin identical with that used in example 2. In repeating this operation, 64% of the resin in addition to the total weight of the extrudates was incorporated.

The granules, whose pore volume was 1.0 m³/g, then underwent carbothermal reduction under the conditions described in example 4. A weight loss of 29% resulted.

The granules were subsequently decarburized according to the procedure used in example 4. The excess carbon represented 87.45% of the total weight of the material before treatment. Finally, a powder was collected in which alumina and carbon were absent. This final product consisted of aluminum nitride whose specific area was 76 m²/g with the crystallized phase representing 35% of that amount.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

We claim:

1. A process for forming a metal nitride powder which comprises:
   reacting at least one metal oxide composition with a binder and a material capable of supplying carbon to said reaction, or with a binder capable of supplying said carbon so as to produce granules having a controlled pore volume ranging from about 0.1 to 3 cm³/g;
   subjecting said granules to a carbothermal reduction reaction at a temperature ranging between about 1300°–1600° C. in an atmosphere containing nitrogen or which is capable of releasing nitrogen so as to form said metal nitride powder wherein said powder contains an excess of said carbon;
   heating said powder so as to decarbonize said metal nitride until substantially all of said excess carbon is eliminated; and
   collecting said metal nitride powder in the form of particles or agglomerates, said metal nitride powder having a specific surface area of at least about 30 m²/g.

2. A process for forming a metal carbide power which comprises:

reacting at least one metal oxide composition with a binder and a material capable of supplying said carbon to said reaction, or with a binder which is capable of supplying said carbon so as to produce granules having a controlled pore volume ranging from about 0.1 to 3 cm$^3$/g;

subjecting said granules to a carbothermal reduction reaction at a temperature ranging between about 1300° and 1600° C. in a neutral atmosphere so as to form said metal carbide powder wherein said powder contains an excess of carbon;

heating said powder so as to decarbonize said metal carbide until substantially all of said excess carbon is eliminated; and collecting said metal carbide powder in the form of articles or agglomerates, said metal carbide powder having a specific surface area of at least about 30 m$^2$/g.

3. The method of claim 2 wherein said atmosphere is comprised of hydrogen.

4. The method of claim 2 wherein said atmosphere comprises a noble gas.

5. The method of claim 1 or 2 wherein said at least one metal oxide is selected from the group consisting of SiO$_2$, Al$_2$O$_3$, TiO$_2$ ZrO$_2$, HfO$_2$ and B$_2$O$_3$.

6. The method of claim 5 wherein the particle size of said metal oxides is less than 10 micrometers.

7. The method of claim 6 wherein the particle size of said metal oxides ranges between about 0.1-5 micrometers.

8. The method of claims 1 or 2 wherein said binder is a coal tar, an organic resin or an organic polymer.

9. The method of claim 8 wherein said resin is a thermosetting resin of phenol formaldehyde, epoxy, polyimide, polyurea or polycarbonate.

10. The method of claim 1 or 2 which further comprises adding said binder in an amount such that the carbon/metal oxide molar ratio is greater than 1.

11. The method of claim 10 wherein said molar ratio ranges between about 2-60:1.

12. The method of claim 1 or 2 which further comprises kneading said reaction mixture of said metal oxide and said binder to facilitate the formation of said granules, prior to subjecting then to said carbothermal reduction reaction, at a temperature between ambient and 200° C.

13. The method of claim 1 or 2 wherein the pore volume of said granules may be more precisely regulated by varying the amount of binder used in the reaction or by varying the temperature or pressure conditions utilized during the formation of said granules.

14. The method of claim 1 or 2 which further comprises coking said binder at between about 350°-500° C. prior to mixing said binder with said at least one metal oxide.

15. The method of claim 1 wherein the amount of nitrogen used ranges from about 2-10 times the stoichiometric requirement for said reaction.

16. The method of claim 1 or 2 which further comprises controlling the emission of carbon monoxide produced as a result of said decarbonizing reaction.

17. The method of claim 1 or 2 wherein said decarbonization step is carried out at between about 500°-800° C.

18. The method of claim 1 or 2 which further comprises grinding or screening said agglomerates so as to render the dimensions of said agglomerates more uniform in size.

19. A process for forming a metal nitride powder which comprises:

mixing at least one metal oxide composition, selected from the group consisting of SiO$_2$ Al$_2$O$_3$, TiO$_2$, ZrO$_2$, HfO$_2$ and B$_2$O$_3$ and having a particle size between about 0.1-5 micrometers with a binder which has been coked at between about 350°-500° C., wherein said binder/metal oxide molar ratio is between about 2-60:1, said binder being a coal tar, a thermosetting resin or an organic, polymer at between ambient temperature and 200° C. to produce a paste;

extruding said paste;

heating said extrudate to a temperature between about 50°-250° C. so as to dry said binder, forming granules from said extrudate having a pore volume ranging between about 0.1-3 cm$^3$/g;

subjecting said granules to a carbothermal reduction reaction at a temperature between about 1300°-1600° C. in a nitrogen atmosphere or an atmosphere capable of releasing nitrogen, wherein the amount of nitrogen used ranges from about 2-10 times the stoichiometric requirement for the reaction so as to form agglomerates of a metal nitride powder wherein said powder contains an excess of carbon;

grinding or screening said agglomerates so as to render the dimension of said powder more uniform in size and wherein the largest dimension of each of said granules ranges between about 1-30 mm;

heating said uniformly dimensioned powder to a temperature between about 500°-800° C. until substantially all of said excess carbon is reacted with oxygen so as to form a carbon monoxide gas;

controlling said gaseous carbon monoxide emission produced as a result of said decarbonization step; and collecting said metal nitride powder in the form of particles or agglomerates, said metal nitride powder having a specific source area of at least about 30 m$^2$/g.

20. A process for forming a metal carbide powder which comprises:

mixing at least one metal oxide composition selected from the group consisting of Al$_2$O$_3$, TiO$_2$, ZrO$_3$, HfO$_2$ and B$_2$O$_3$ and having a particle size between about 0.1-5 micrometers with a binder which has been coked at between about 350°-500° C., wherein said binder-metal oxide ratio is between about 2-60:1, said binder being a coal tar, a thermosetting resin or an organic polymer, at between ambient temperature and 200° C. to produce a paste;

extruding said paste;

heating said extrudate to a temperature between about 50°-250° C. so as to dry said binder;

forming granules from said extrudate having a pore volume ranging between about 0.1-3 cm$^3$/g.

subjecting said granules to a carbothermal reduction reaction at a temperature between about 1300°-1500° C. in a neutral atmosphere so as to form agglomerates of a metal carbide powder wherein said powder contains an excess of carbon;

grinding or screening said agglomerates so as to render the dimension of said powder more uniform in size and wherein the largest dimension of each of said granules ranges between 1-30 mm;

heating said uniformly dimensioned powder to a temperature of between about 500°-800° C. until substantially all of said excess carbon is reacted with oxygen so as to from a carbon monoxide gas;

controlling said gaseous carbon monoxide emissions produced as a result of said decarbonization step; and collecting said metal carbide powder in the form of particles or agglomerates, said metal carbide powder having a specific surface area of at least about 30 m$^2$/g.

21. A process for forming a silicon nitride powder which comprises:

reacting a silicon oxide composition with a material capable of supplying carbon to said reaction to produce granules having a controlled pore volume ranging from about 0.1 to 3 cm$^3$/g;

subjecting said granules to a carbothermal reduction reaction at a temperature ranging between about 1300°-1600° C. in an atmosphere which contains or is capable of releasing nitrogen to form a silicon nitride powder containing excess carbon;

heating said powder until said excess carbon is substantially eliminated to produce a silicon nitride powder having a specific surface area of at least 30 m$^2$/g; and collecting said silicon nitride powder in the form of particles or agglomerates.

22. A process for forming an aluminum nitride powder which comprises:

reacting an aluminum oxide composition with a material capable of supplying carbon to said reaction to produce granules having a controlled pore volume ranging form aobut 0.1 to 3 cm$^3$/g;

subjecting said granules to a carbothermal reduction reaction at a temperature ranging between about 1300°-1600° C. in an atmosphere containing or capable of releasing nitrogen so as to form aluminum nitride powder containing excess carbon;

heating said powder until said excess carbon is substantially eliminated to produce an aluminum nitride powder having a specific surface area of at least 30 m$^2$/g; and collecting said aluminum nitride powder in the form of particles or agglomerates.

* * * * *